United States Patent [19]

Hanyzewski et al.

[11] 4,445,553

[45] May 1, 1984

[54] APPARATUS FOR SHAPING A WOODEN WORKPIECE

[76] Inventors: Eugene F. Hanyzewski, 8528 N. 37th Ave., Phoenix, Ariz. 85021; Kenneth A. French, 10926 N. 88th Dr., Peoria, Ariz. 85345; Thomas S. Walker, 8741 W. Flower, Phoenix, Ariz. 85037

[21] Appl. No.: 329,304

[22] Filed: Dec. 10, 1981

[51] Int. Cl.³ .............................................. B27C 5/06
[52] U.S. Cl. .............................. 144/145 A; 144/1 A; 409/93
[58] Field of Search ..................... 33/23 H, 23 K, 189, 33/174 G; 144/134 R, 134 A, 1 A, 137, 144 R, 144 S, 145 R, 145 A, 145 C, 372; 409/84, 93, 79, 126

[56] References Cited

U.S. PATENT DOCUMENTS

| | | | |
|---|---|---|---|
| 3,442,309 | 5/1969 | Jentsch | 144/144 R |
| 3,541,922 | 11/1970 | Dunlap | 144/144 R |
| 3,739,826 | 6/1973 | Schell | 144/145 R |
| 3,800,842 | 4/1974 | Schell | 144/145 R |
| 3,841,370 | 10/1974 | Schell | 144/145 R |

FOREIGN PATENT DOCUMENTS 2368330  6/1978  France .................................. 409/93

Primary Examiner—W. Donald Bray
Attorney, Agent, or Firm—Gregory J. Nelson

[57] ABSTRACT

An apparatus for shaping a wooden workpiece according to a template configuration including a carriage supported on a motion translating device displaceable either longitudinally or transversely. A template follower is secured to the carriage and is engagable with selected templates. Any of a selected number of cutter heads may be brought into engagement with the workpiece by rotating a turret carrying the selected cutters to the desired position and engaging the cutter shaft with the motor shaft at a detachable coupling. Another embodiment of the invention utilizes a pantograph mechanism and is adaptable for use with conventional shapers.

2 Claims, 10 Drawing Figures

APPARATUS FOR SHAPING A WOODEN WORKPIECE

The present apparatus relates to a device for shaping a wooden workpiece according to a template configuration and more particularly relates to a device for manufacturing raised panel door components.

Typically raised panel doors consist of five components including the center panel and four frame members which fit around the edge of the center panel. The frame members and center panel must be routed with the proper design and proper grooving for interfitting the components. Traditionally, the manufacture of these components is done in a series of separate operations such as preshaping, band sawing, routing and the like. Woodworking shops have been relatively slow to develop specialized equipment for routing and shaping and most panel door components and other woodworking pieces required shaping has been done on conventional machines.

Several devices can be found in the prior art in the form of router/template attachments for use in conjunction with routers for providing the capability for routing designs such as arcuate designs in wood workpieces. Typical of these patents are U.S. Pat. Nos. 4,114,664; 3,716,085 and 3,199,556. Though these devices do increase the versatility and efficiency of routing, they are limited in their application and generally for low production such as for use in home shops. Accordingly, there exists a need for a woodworking device particularly adapted for shaping the components of a raised panel door which can manufacture all the components on a single machine and which has the versatility to be adaptable to impart different shapes to the woodpiece. Further, there is a need for a device of this type which can be run by a single operator on a high production basis which will reproduce a desired cut with efficiency and accuracy, eliminating the multiple operations conventionally practiced.

Briefly, in accordance with the present invention, an apparatus for shaping wood is provided comprising a table and frame which supports a motion translating carriage assembly consisting of a pair of tables one adapted to slide on rods in an X-X axis and one in the Y-Y axis. A guide is attached to the assembly to trace the desired pattern on a template. The workpiece is securable to the carriage assembly. A rotatable turret carrying a plurality of woodworking cutters or blades is mounted adjacent the carriage and can be rotated to bring the desired cutter or blade into a working position to impart the desired cut in the workpiece.

In another embodiment of the present invention, the motion is imparted though a parallelogram or pantograph linkage attachable to the surface of a conventional shaper.

The above and other objects and advantages of the present invention will be more fully appreciated from the following description, claims and drawings in which:

FIG. 4 is a plan view of the fence which is attachable to the woodworking apparatus;

Figure 1:
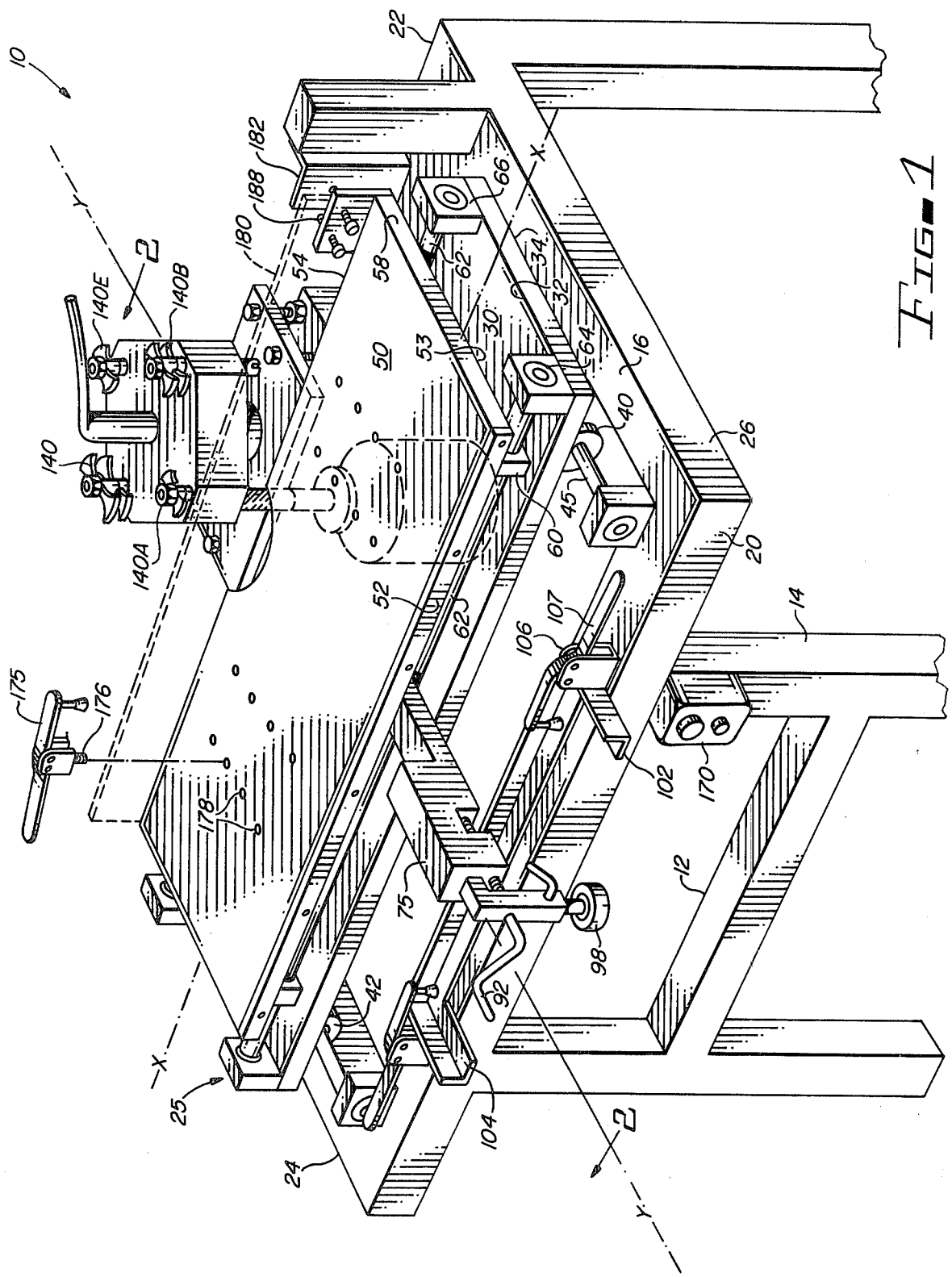
FIG. 1 is a perspective view of the woodworking apparatus of the present invention.

Turning to the drawings, particularly FIGS. 1 through 6, the woodworking apparatus of the present invention is generally designated by the numeral 10 and includes a base 12 having depending legs 14 and horizontal table 16 which is shown as being generally rectangular having front edge 20, rear edge 22 and opposite side edges 24 and 26. Motion translating device 25 is positioned on table 16. For purposes of reference, the motion translating device will be described with reference to longitudinal axis X-X and intersecting transverse axis Y-Y. Motion translating devices are sometimes generally termed X-Y devices. The motion translating device 25 consists of a lower table 30 which is generally rectangular having upper surface 32 and lower surface 34. Bearing blocks 40 are mounted on the underside 34 of table 30 adjacent the right edge of the table as viewed in FIG. 1. Similarly, bearing blocks 42 are mounted on the underside of surface 34 of table 30 adjacent the left end of the table. Each set of bearing blocks are slidably mounted on transversely extending rods 45 secured in brackets 48 adjacent the front edge 20 and the rear edge 22 of table 16. In this way, table 30 is reciprocable transversely along rods 45.

Upper carriage or table 50 is adapted to move to move in the X-X axis. Table 50 is generally rectangular having front edge 52, rear edge 54 and opposite side edges 56 and 58. The upper surface 51 of table 50 supports the workpiece as will be described hereafter. The underside 53 of table 50 carries bearing blocks 60 positioned adjacent the front edge 52. Similarly, bearing blocks, not shown, are positioned on the underside of table 50 adjacent the rear edge 54. Bearing blocks 60 support carriage 50 for slidable movement along parallel rods or rails 62 mounted on supports 64 and 66 at either end of lower table 30. Thus, by the cooperative motion along the X-X and Y-Y axis of tables 30 and 50, respectively, a workpiece on table 50 can be moved to any desired horizontal position.

Figure 2:
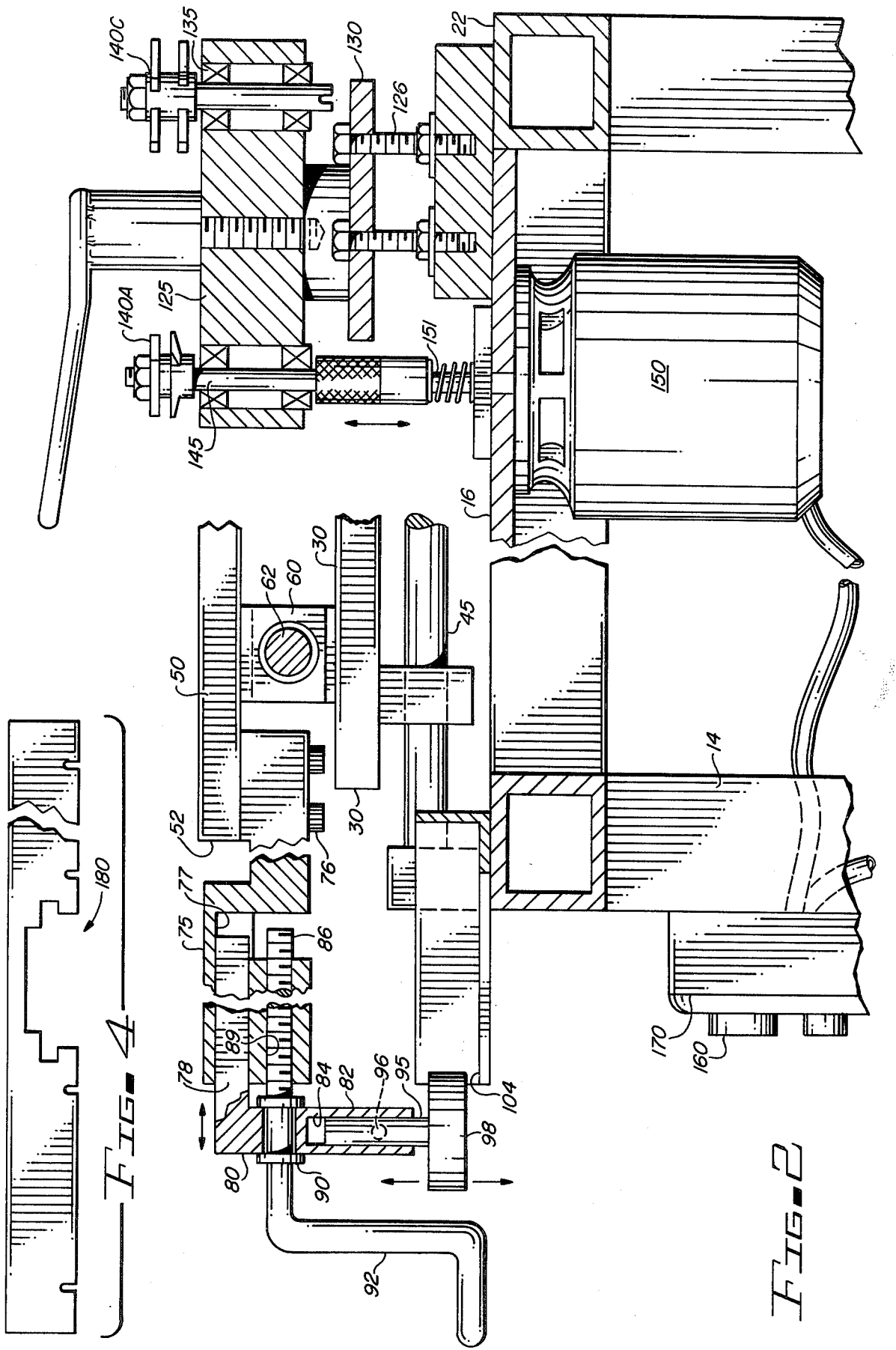
FIG. 2 is a sectional view taken along lines 2—2 of FIG. 1.

As best seen in FIGS. 1 and 2, a generally U-shaped yoke 75 projects from the front side 52 of table 50 and is secured to the underside of table 50 by bolts 76. Yoke 75 defines transversely extending opening 77 which slidably receives horizontal arm 78 of follower support 80. Follower support 80 includes vertically depending leg 82 which defines a vertically extending bore 84. Lead screw 86 is in threaded engagement in threaded bore 89 extending in yoke 75 parallel to recess 77. A pair of stops 90 in the form of cylindrical enlargements on lead screw 86 are positioned at either side of depending leg 82 of follower support 80. Therefore, by turning handle 92, lead screw 86 can be advanced or retracted relative to yoke 75, in turn, driving the follower support 80 in and out of the yoke. Therefore, by manipulation of handle 92, the transverse position of follower suport 80 can be adjusted. Bore 84 receives shaft 95 which can be vertically adjusted by means of set screw 96. The lower end of shaft 95 carries rotatable follower 98.

Figure 3:
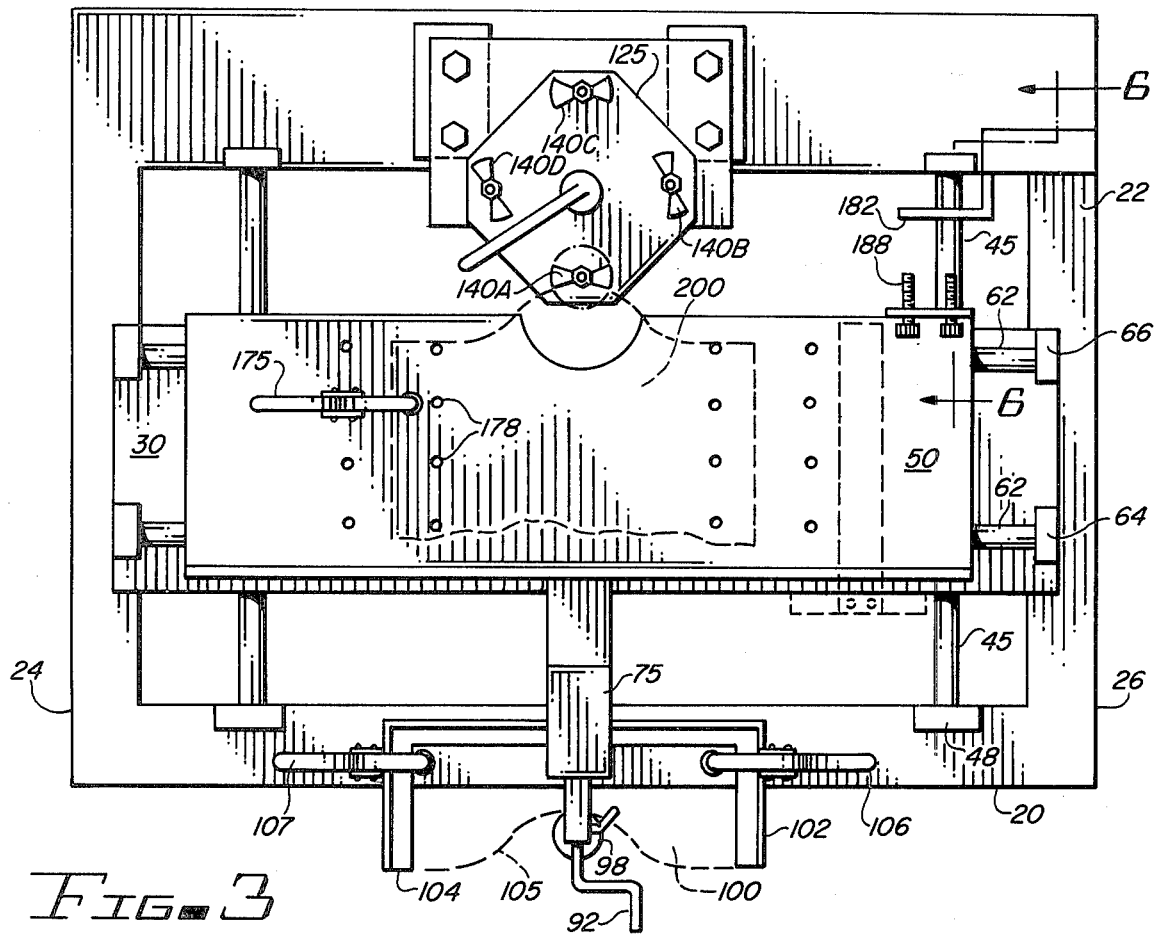
FIG. 3 is a plan view of the apparatus.

Follower 98 is adapted to cooperate with a template 100 of any desired configuration. Template 100, as shown in FIG. 3 may, for example, have a concave guide edge 105 to impart a corresponding shape to the upper edge of a panel of a workpiece such as a paneled door. Template 100 can be interchanged and template of any desired configuration can be secured to the apparatus at frame 102 which consists of angle-shaped channels defining a lip 104 for receiving the template. The template is secured in place on frame 102 by means of clamps 106 which are shown as over-center toggle clamps operable by handles 107.

A principal advantage of the woodworking apparatus of the present invention resides in its versatility. Any one of a number of selected cutters can be easily brought into operative position for shaping or routing a workpiece. To this end, a rotatable turret or head 125 is rotatably mounted on base plate 130 elevated on bolts 126 at a central location adjacent the rear edge 22 of frame 16. Turret 125 aligns with the top surface of table 50. Turret 125 is shown as being generally hexagonal block rotatable by means of handle 132.

Figure 5:
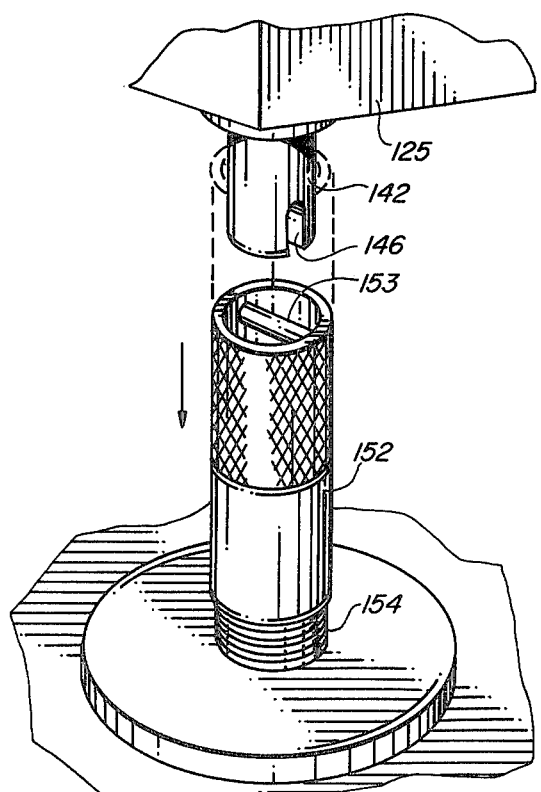
FIG. 5 is a detail perspective view of the turret coupling.
Figure 6:
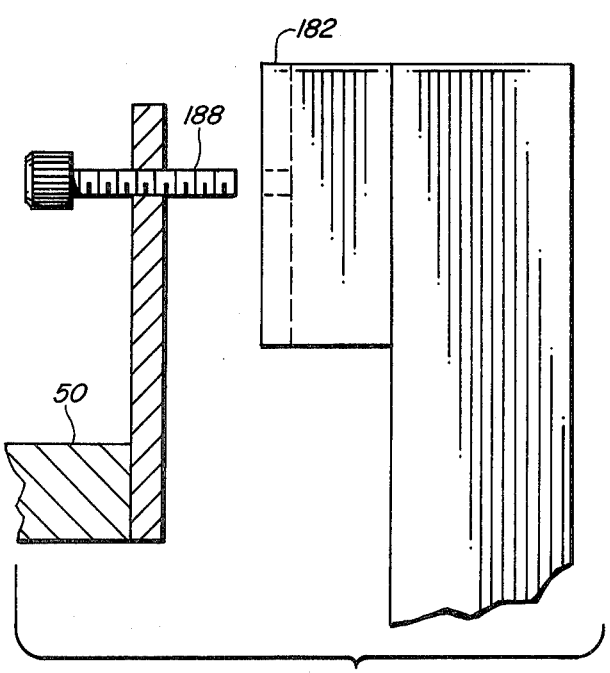
FIG. 6 is a detail view of a portion of the bracket and table.

A plurality of individual cutters or shapers 140A, 140B, 140C and 140D are each rotatably mounted on a vertical shaft 142 mounted in bearings 135 within turret 125. As best seen in FIGS. 2 and 5, the lower end of each of the shafts 142 extends vertically beyond the lower edge of turret 125. A transverse slot 146 extends at the end each of the spindle shafts 142.

Turret 125 can be rotated to bring any of the shafts 142 into driven engagement with motor 150. The output shaft 151 of motor 150 is provided with cylindrical coupling 152 which is urged upwardly by spring 154 interposed between the sleeve 152 and motor 154. Therefore, any of the selected cutter heads 140A–140D can be brought into driven engagement with motor 150 by rotating the turret to a position with the cutter adjacent table 50 and axially aligned with follower yoke 75. Motor coupling 152 is depressed to allow spindle shaft 142 of the turret to be vertically aligned with the motor shaft 151. Once shaft 142 and shaft 151 are aligned, coupling 152 can be released and due to the influence of spring 154 will engage the spindle shaft as best seen in FIGS. 2 and 5. In engaged position, locking pin 153 of the coupling will seat in slot 146 of the spindle shaft.

Motor controls 160 are positioned at control box 170 secured to the frame at a convenient location. Details of motor controls have been omitted for purposes of clarity since these are conventional and well-known in the art.

A workpiece 200 may be secured in any desired position on table 50 by clamps 175 which are shown as toggle clamps. Toggle clamps 175 include a threaded shaft 166 which may be placed in threaded engagement with internally threaded bore 178 variously positioned or located on carriage or table 50.

A vertical fence 180 may be positioned adjacent the rear edge of frame 28 and detachably secured in spaced apart brackets 182 at either end of the table by bolts 188. With bolts 188 secured to brackets 182, the carriage is fixed and restrained against movement.

The present invention will be more fully appreciated from the following description of operation. With the apparatus as described above, the desired template 100 is first selected. For example, for shaping the edge of a raised panel door, template configured similar to that shown in FIG. 3, designated by the numeral 100, would be selected and engaged on the template tray 104 and secured in place by clamps 105. Workpiece 200 is secured to the top of the table by a plurality of clamps 175 which have been positioned in the selected threaded bores 175 in the table. Note the workpiece is oriented or aligned symmetrical with the transverse centerline of the table 50. Indicia or markings may be etched in the table to facilitate orientation and positioning the workpiece. Spindle 152 is vertically depressed and turret 140 is rotated to bring the desired cutter 140A to 140D into alignment with the motor shaft. When this is accomplished, coupling 152 is released and the cutter shaft is coupled in driven engagement with the motor.

Follower 98 is horizontally and vertically adjusted into engagement with the contoured surface 105 of the template. This is accomplished by turning handle 92 until the edge of the follower 98 is in the proper position. The vertical position of the follower can be adjusted by means of the set screw 96.

Motor 152 is actuated through motor control 170. The tables 30 and 50 are moved longitudinally and transversely to cause follower 98 to trace the contour on the edge of the template 100. The tables will trace or duplicate the contour by respective movement along transverse shafts 45 and longitudinal shaft 62. Accordingly, the motion will be translated causing the pattern to be imparted to the edge of workpiece 200 as best seen in FIG. 3.

The woodworking apparatus of the present invention can also be used in a fixed table position. To accomplish this, the tables 30 and 50 are moved rearwardly until bracket 182 engages and aligns with bolts 188 on the table frame. Fence 180 is inserted and fastener members 188 are secured in position in bracket 182. This causes the entire table assembly to become rigid to accomodate straight cuts.

Therefore, from the foregoing, it appears that the woodworking apparatus provides a simple, versatile, and highly efficient apparatus for reproducing any of a variety of shapes to a workpiece.

Figure 9:
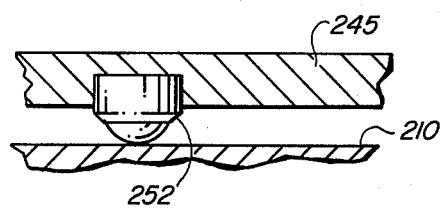
FIG. 9 is a detail view showing the table roller supports.

FIGS. 7 to 10 show an alternate embodiment of the present invention which is designed to be easily, and conveniently adapted to most conventional shapers. In this embodiment, shaper table surface 210 is conventional and includes a vertically extending cutter or shaper head 212. The apparatus consists of a mounting arm 218 which may be secured along an edge of table 200 by fasteners 210. Motion translating mechanism shown as a parallelogram linkage 215, sometimes called a pantograph, is secured adjacent the outer end of arm 218. Linkage 215 consists of arms 219, 220 each pivotally connected to bar 218 at pin connections 222. The outer ends of arms 219 and 220 are joined by longitudinally extending link 225 at pin connections 228 and 230. Arms 232 and 234 are also pivotally connected at connections 228 and 230 having their outer ends pivotally connected to arm 240 which extends parallel to arm 218. Arm 240 supports carriage 245 which is provided with workpiece holders or clamps 250. As best seen in FIG. 9, the underside of carriage 245 may be provided with one or more rollers 252 to support carriage 245 and provide for easy movement of the carriage on table 200.

Follower arm 260 extends transversely at one edge of carriage 245 having a slotted end 262 within which is rotatable follower or guide 265. Template clamps 270 are secured to arm 218 so that template 275 may be attached thereto.

Figure 8:
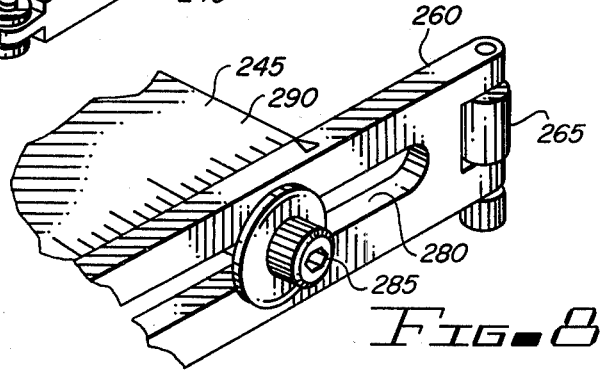
FIG. 8 is a detail view of the follower as seen in FIG. 7.

As best seen in FIG. 8, arm 260 is preferably slotted at 280 and secured to the carriage or mobile table 245 by bolt 285. To allow adjustment of the follower relative to the table, indicia 290 may also be etched at an appropriate location on carriage 245 for the convenience of the user.

As is apparent in FIGS. 7 to 10, once a workpiece 300 is secured to carriage 245 by clamps 250 and template 275 placed in template holders 270, linkage 215 can be manipulated to cause the follower 265 to trace the pattern of the template. The shape of the edge of the template will be imparted to the edge of the workpiece. The tool rotates at high speeds so there is minimal pressure on the workpiece.

Figure 7:
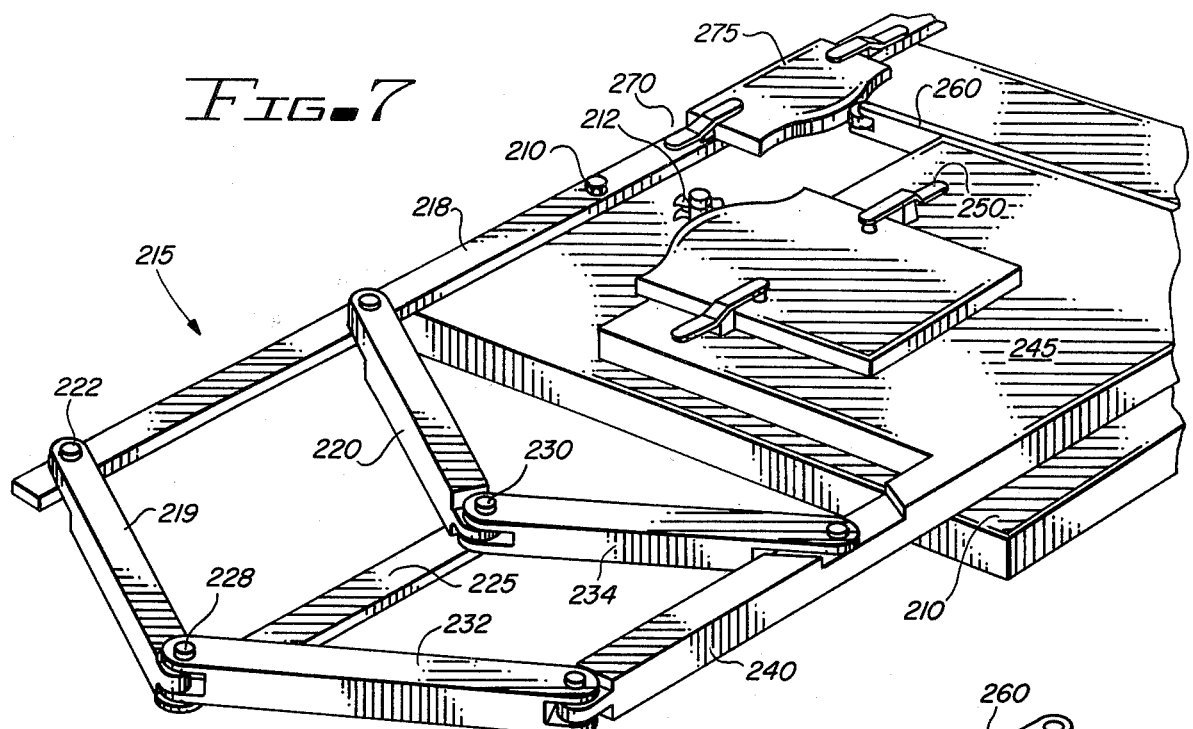
FIG. 7 is a perspective view of another embodiment of the present invention.
Figure 10:
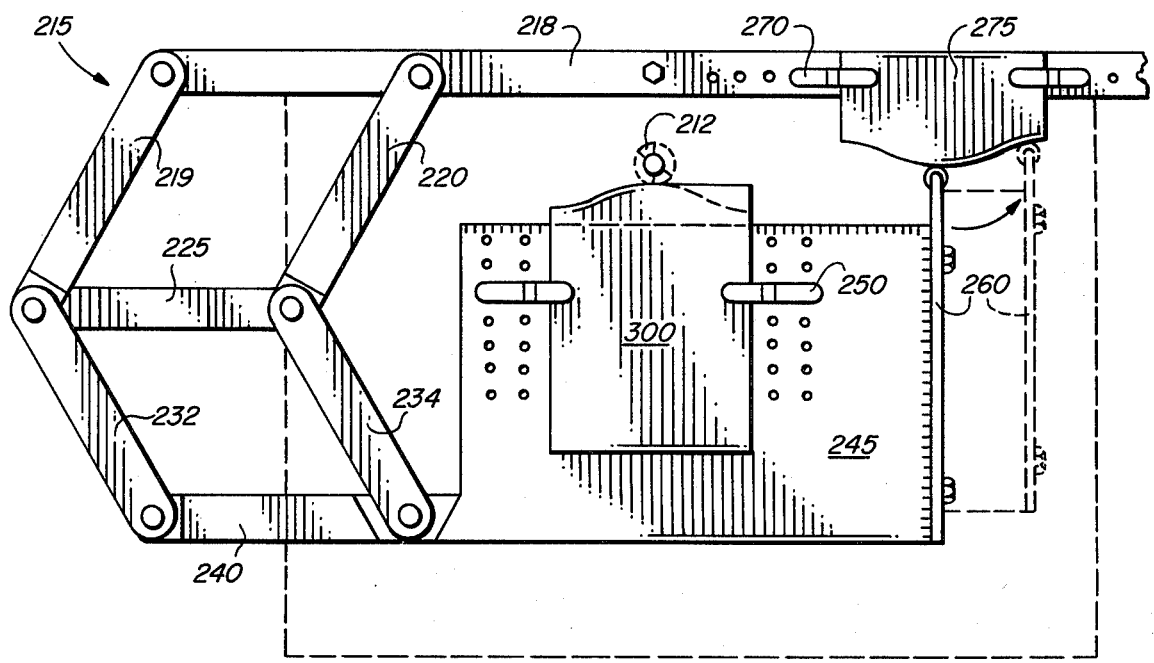
FIG. 10 is a plan view of the woodworking apparatus shown in FIG. 7.

The apparatus of the embodiment of FIGS. 7 and 10, as pointed out above, is particularly adaptable for use with conventional shapers or other woodworking tools. The device is simple and efficient and provides the operator with the ability to easily impart any desired shape to a workpiece.

The details of the present invention have been fully described with reference to several illustrative embodiments. However, it will be obvious to those skilled in the art to make various changes, modifications and alterations to the structure arrangement proportions, elements, material and components used in the practice of the invention. To the extent that these changes, alterations and modifications do not depart from the spirit and scope of the appended claims, they are intended to be encompassed therein.

We claim:

1. An apparatus for shaping a workpiece to reproduce the configuration of the guide edge of a template, said apparatus comprising:
   (a) a frame;
   (b) a motion translating device on said frame including a carriage for said workpiece, said motion translating device including a first table slidable along bearing means in a first direction and a second table slidable along bearing means on said first table along an axis perpendicular to the direction of movement of said first table;
   (c) a follower secured to said second table including means for adjusting the position of the follower with respect to the guide surface;
   (d) a template holder on said frame for detachably securing a template therein, said template having a guide surface;
   (e) a cutting tool including a rotatable turret having a plurality of cutting heads and means for engaging selected of the cutting heads in driven relationship with drive means, said cutting tool being positioned adjacent said carriage whereby a workpiece can be positioned on said carriage and the carriage manually manipulated with the follower in engagement with the guide surface of the template to cause the corresponding shape of the guide surface to be reproduced at the workpiece; and
   (f) means for locking the said motion translating device in a fixed position.

2. The apparatus of claim 1 wherein said motion translating device comprises a pantograph mechanism and wherein said cutting tool is part of a shaper and said frame is adapted to be attached thereto.

* * * * *